May 24, 1949.    J. M. PARZINGER    2,470,898
EMERGENCY GENERATING SYSTEM FOR AUTOMOBILES
Filed Feb. 16, 1948    4 Sheets-Sheet 1
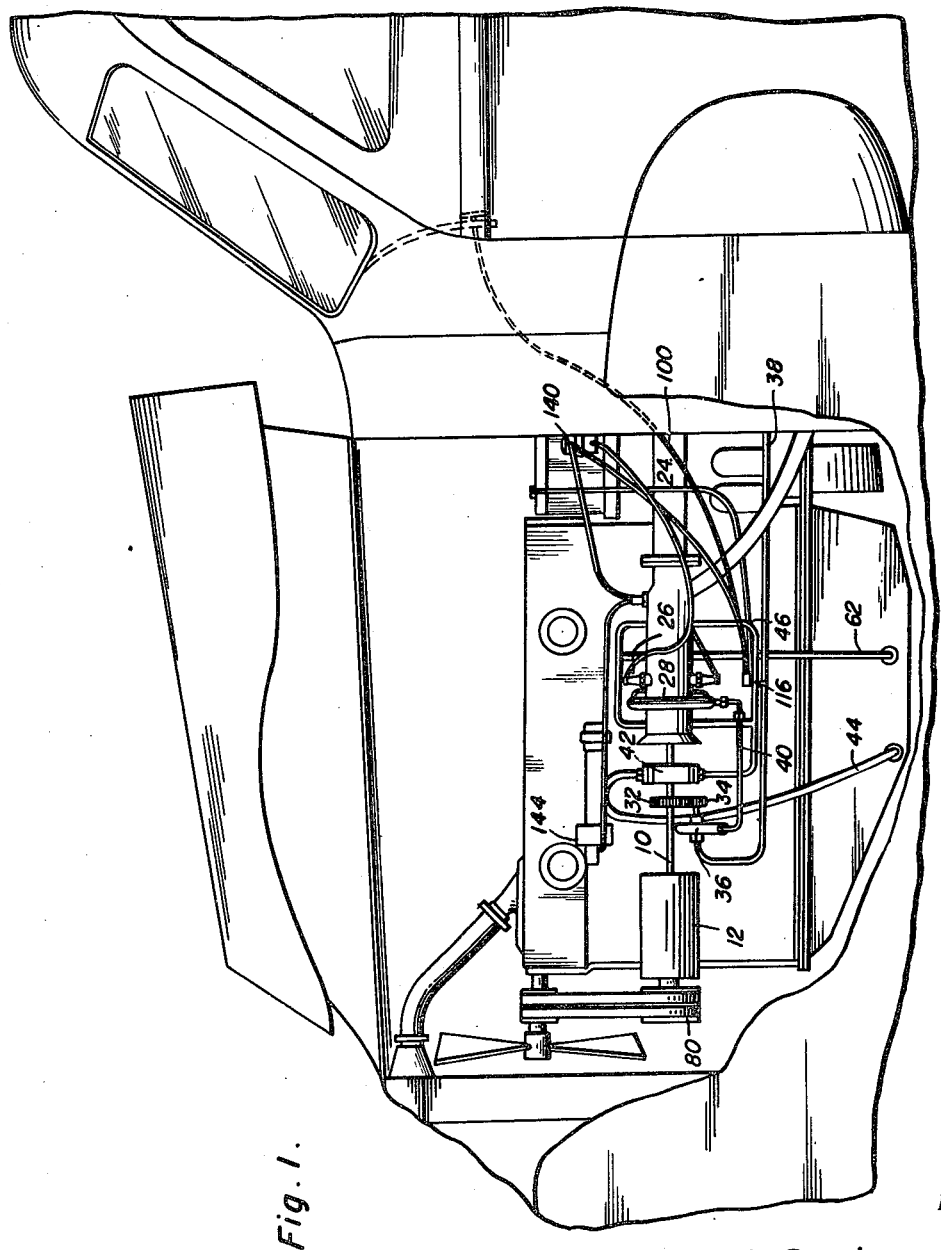
Fig. I.
Inventor
Joseph M. Parzinger

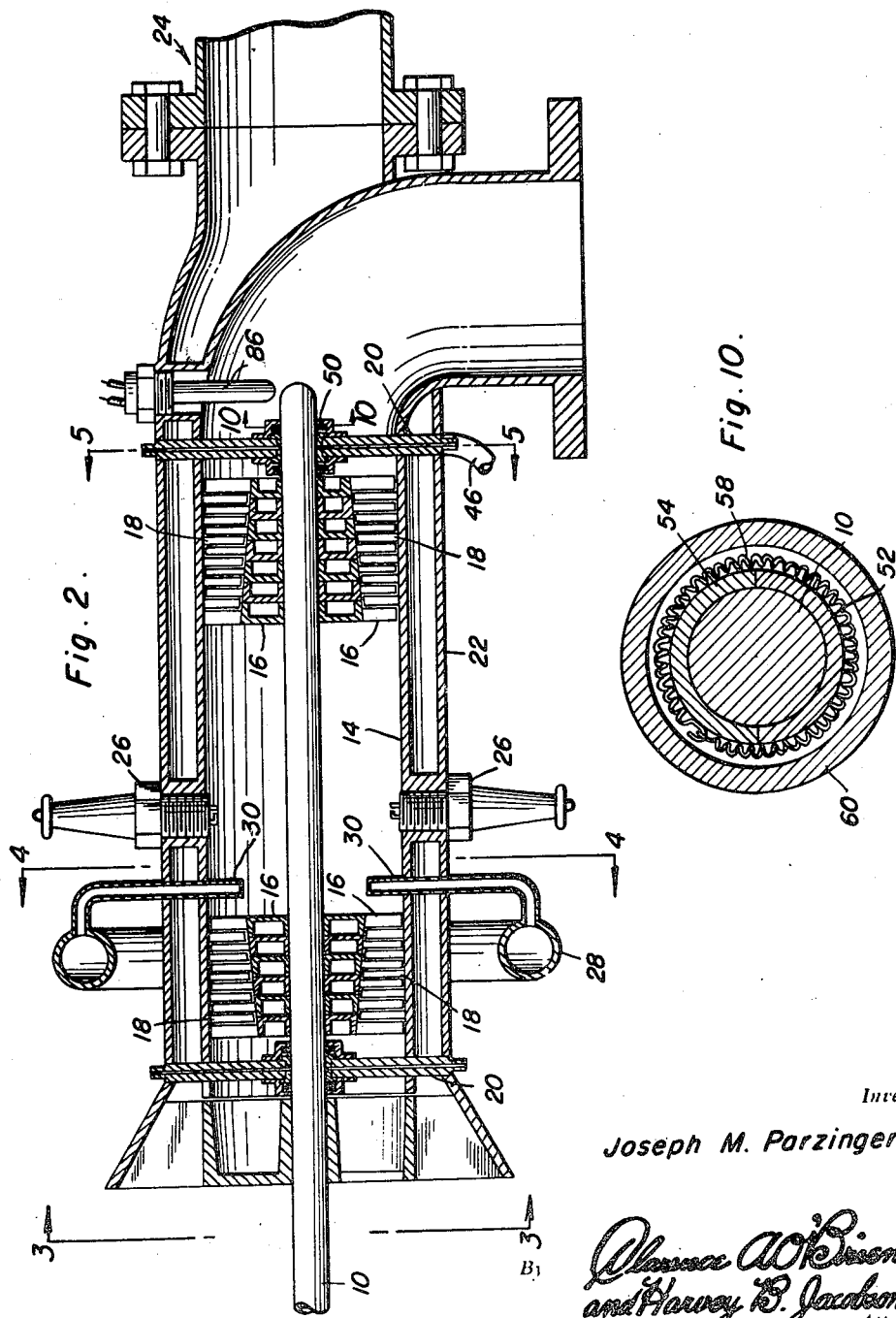

May 24, 1949.     J. M. PARZINGER     2,470,898
EMERGENCY GENERATING SYSTEM FOR AUTOMOBILES
Filed Feb. 16, 1948     4 Sheets-Sheet 3
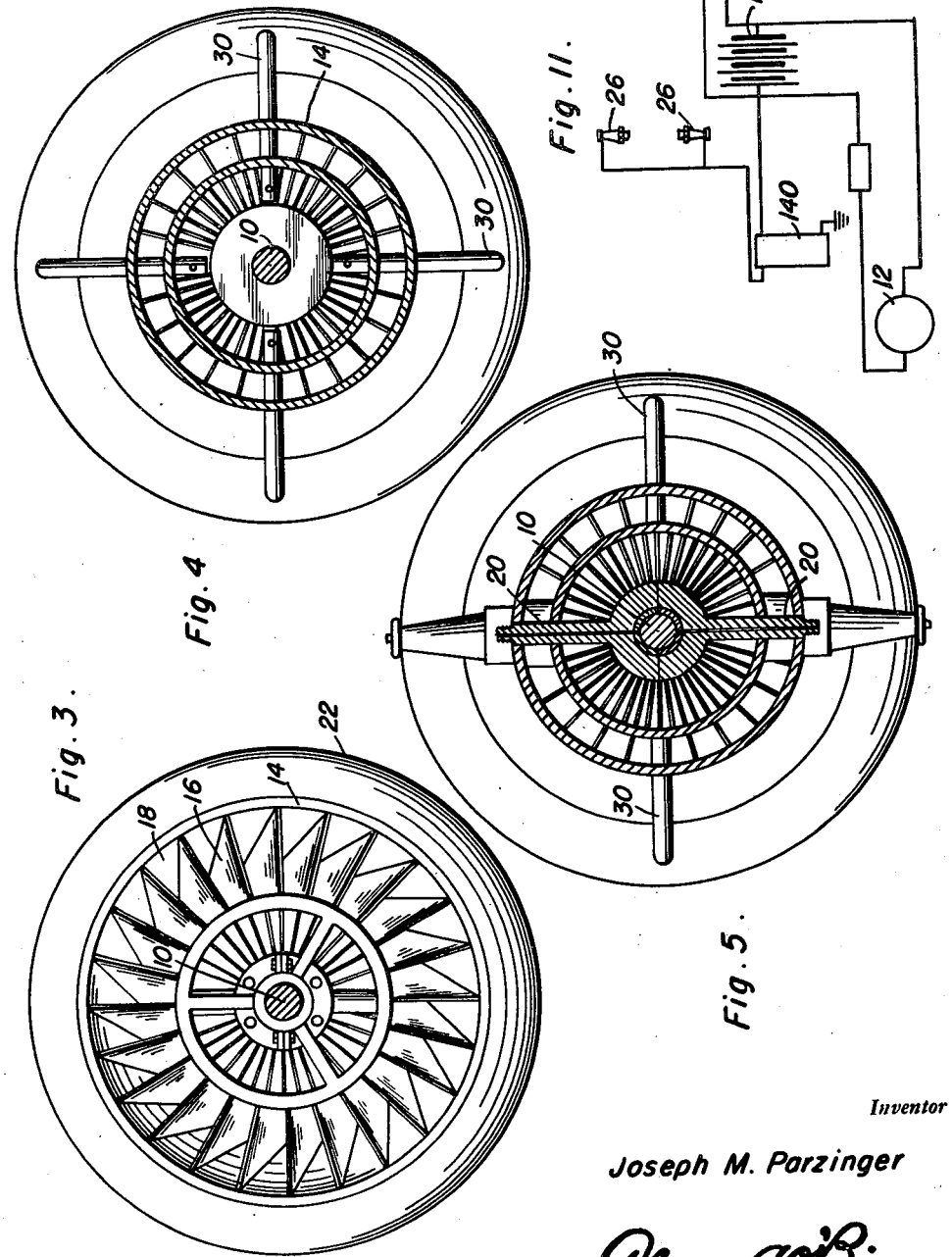
Inventor
Joseph M. Parzinger May 24, 1949.  J. M. PARZINGER  2,470,898
EMERGENCY GENERATING SYSTEM FOR AUTOMOBILES
Filed Feb. 16, 1948  4 Sheets-Sheet 4

*Inventor*
Joseph M. Parzinger

By Clarence A. O'Brien
and Harvey B. Jacobson
*Attorneys*

Patented May 24, 1949

2,470,898

UNITED STATES PATENT OFFICE 2,470,898

EMERGENCY GENERATING SYSTEM FOR AUTOMOBILES

Joseph M. Parzinger, Columbus, Ohio, assignor of thirty per cent to Max H. Parzinger, Columbus, Ohio Application February 16, 1948, Serial No. 8,703

4 Claims. (Cl. 290—4)

This invention appertains to novel and useful improvements in attachments for automotive vehicles.

An object of this invention is to charge the conventional battery associated with automotive vehicles while the vehicle is inoperative; utilize a conventional automotive vehicle generator for the above mentioned object; obviate the necessity of operating a relatively high rated (horsepower) engine for producing a relatively small amount of charging effect; charge automotive vehicle batteries without the necessity of frequenting a professional establishment; maintain the battery of a vehicle in the optimum condition (of charge) at all times; provide means for carrying out the above mentioned functions which is adapted to heat the interior of the vehicle having the apparatus associated therewith; maintain a charging condition while the vehicle is inoperative and various appurtenances of the vehicle such as radio, lights and the like are being utilized; and to provide electrical energy for uses outside of a vehicle.

Ancillary objects and features of novelty will become apparent to those skilled in the art, in following the description of the preferred form of the present invention, illustrated in the accompanying drawings, wherein:

Figure 1 is a pictorial view of the instant invention showing the same utilized in conjunction with a conventional vehicle;

Figure 2 is a longitudinal sectional view of the prime mover utilized in conjunction with the present invention and forming a portion thereof;

Figure 3 is a transverse sectional view of the invention shown in Figure 3 and taken on the line 3—3 thereof and in the direction of the arrows;

Figure 4 is a transverse sectional view taken on the line 4—4 of Figure 2;

Figure 5 is a transverse sectional view taken on the line 5—5 of Figure 2;

Figure 10 is a sectional detail of construction taken on the line 10—10 of Figure 2 and in the direction of the arrows; and Figure 11 is a wiring diagram illustrating only portions of the wiring system and pertinent devices.

Referring now in detail to the illustrated preferred embodiment of the present invention, like reference characters are used throughout to indicate similar elements thereof.

Figure 9:
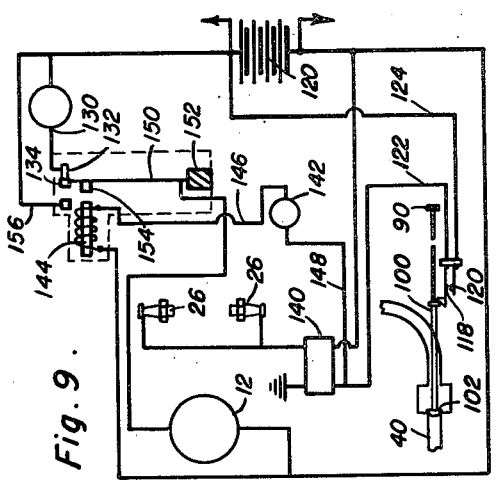
Figure 9 illustrates the wiring diagram and control devices of the system.
Figure 8:
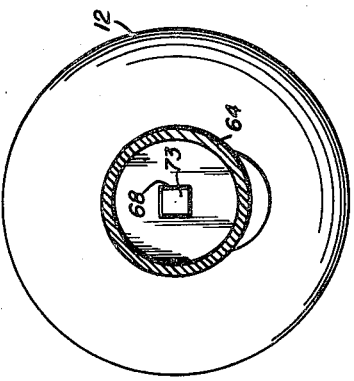
Figure 8 is a sectional view taken on the line 8—8 of Figure 7 and in the direction of the arrows.

This invention has been conceived and developed to provide a device for the purpose of utilizing a conventional generator associated with an internal combustion engine of a vehicle both as a motor and a generator, selectively, whereby the battery of the vehicle may be maintained at the optimum condition of charge. As is well-known, it is often necessary to replenish the potential energy in a battery due to various conditions and for various reasons. During cold weather, and in climates wherein the initial actuation of an internal combustion engine is difficult, replenishing the potential energy in a battery becomes a burden. By utility of the present invention, the condition of the battery is maintained at all times during the life of the battery at the optimum condition. The battery is automatically maintained at this optimum condition without taxation of the conventional internal combustion engine in a vehicle.

A very small portion of the fuel supply of the engine is utilized for actuating an axial flow compressor and turbine for the purpose of turning the conventional shaft of a starting-generating dynamo. Positioned at the forward end of the said starting-generating dynamo is an apparatus for automatically connecting and disconnecting the said shaft to the conventional fan belt of the engine. Accordingly, while the axial flow compressor-turbine is in operation, the generator is not drivingly connected to the said internal combustion engine.

The said axial flow, compressor-turbine is preferably ignition fired by use of a number of conventional spark plugs. Also, the turbine housing is so arranged as to have an insulating space therearound whereby the air in this insulated space may be utilized for the purpose of heating the interior of a conventional vehicle.

A specially devised circuit and valve mechanism is utilized in conjunction with the aforementioned structure whereby through further use of thermostatic control means the turbine may be rendered operative at selected intervals. In devices of this nature, the lubrication of the bearings is relatively important and accordingly, a pump is associated with the said shaft whereby lubricant may be taken from the crank case of an internal combustion engine and applied to the various bearing points. The fuel injection system is also driven on this shaft by conventional means.

Referring particularly now to Figure 2, it will be seen that a generator shaft 10 extends from the starting-generating dynamo 12 and is elongated. A housing 14 is provided with an axial flow compressor and an axial flow turbine therein. Rotor blades 16 of each are provided on said shaft 10 while stator blades 18 of each are rigidly associated with the said housing 14. It will be noted that specially provided bearings are provided for the said shaft 10 in the said housing 14. Tubes 20 are utilized for supporting these bearings in the said housing 14, the terminal portions of which are adapted to be fed with lubricant as will be described hereinafter.

A sleeve 22 having a flared end portion is provided about the said housing 14 for insulating purposes. Also, an extension generally indicated at 24 may be associated with the said sleeve 22 for the purpose of conducting heated air to the interior of a conventional automotive vehicle. Obviously, this may be utilized as a heater in a vehicle.

The interior portion of housing 14 obviously leads to a suitable exhaust stack which may connect with the conventional muffler of an internal combustion engine system.

The axial flow compressor and turbine is preferably actuated by gasoline or some other suitable fuel having spark ignition. Conventional spark plugs 26 are detachably received in the said housing 14 and may be of any suitable type.

A fuel distributor tube 28 extends about the said housing and has inlets 30 extending therein. These inlets are obviously provided with suitable orifices directed toward the said spark plugs 26 for conducting fuel within the firing chamber of the said housing 14. Suitable timing mechanism is associated with the said spark plugs whereby proper combustion may take place.

Going now to Figure 1, it will be seen that the said shaft 10 has a gear 32 secured thereto, enmeshed with a pinion 34. This pinion drives a suitable, conventional pump 36 which conducts fuel through the line 38, which line is associated with the fuel supply of a conventional vehicle. The fuel is then conducted through the pump 36 and through the line or conduit 40 which is in direct communication with the said distributor tube 28.

It will be noted that a second drive means is associated with the said shaft 10 adjacent the gear 32. This second drive means may be conventional in nature, composing or consisting of a pump 42 which conducts lubricant from the crank case of the internal combustion engine, through the hose 44. Then, a plurality of tubes 46 extends from the outlet side of the said pump 42 to the aforementioned terminal portion of the support members 20. Obviously, lubricant is conducted through the bores of the said support members 20 to the anti-friction bearings associated with the shaft 10. These anti-friction bearings may be purely conventional in nature. However, it has been found desirable to supply inserts 50 having resiliently retained holders at either side thereof. These holders are preferably in the form of split bearings 52 and 54 respectively (see Figure 10) having a resilient member of spring 58 retaining them firmly in place. Suitable cages 60 may be supplied about this structure, serving the purpose of oil seals.

It will be noted further from inspection of Figure 1 that an overflow tube 62 extends from the said tube 46 back to the said crankcase of the conventional internal combustion engine.

Figure 7:
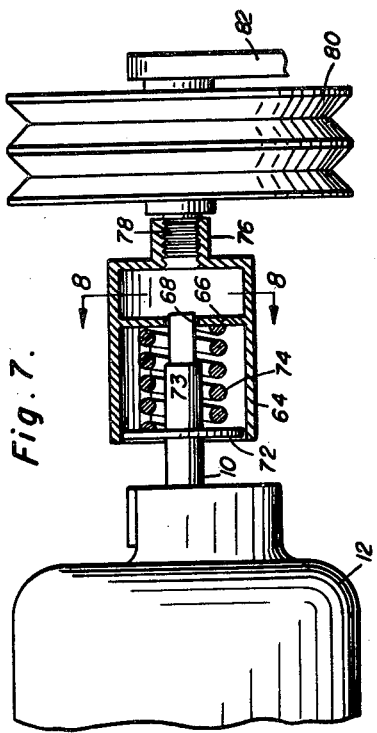
Figure 7 is an elevational view of the selectively operable pulley means associated with the starting-generating dynamo utilized in the invention.

Going now to Figure 7, it will be seen that a clutch mechanism is disclosed. A bendix drive may be utilized in association with this particular part of the invention. However, a simplified construction is disclosed for use, if so desired. A cage 64 having a partition 66 therein is supplied. An aperture 68 is provided substantially centrally of said partition 66 and it is preferably rectangular in cross-section. The terminal portion of the shaft 10 is reduced which reduction is also rectangular in cross-section and the reduced portion is of such length that it extends through the aperture 68 when the cage 64 is in its most forward position (the position illustrated in Figure 7).

A disk 72 is rigidly secured to the said shaft 10 and a spring or other suitable resilient biasing means 74 is seated on the said disk 72 and the said partition 66 for constantly biasing the said cage outwardly of the starting-generating dynamo 12. A bearing or boss 76 is supplied at one end of the said cage 64 having an internally threaded surface. A stub shaft 78 is threadedly received in said boss 76 and has a plurality of pulleys 80 rigidly associated therewith. A suitable stand or support 82 is provided as the bearing surface for the said stub shaft 78, affording additional support.

As the arrangement of elements is shown in Figure 7, the internal combustion engine of the vehicle will be in operation and the turbine is inoperative. The pulleys are rotated by the engine causing the stub shaft 78 to rotate. By this expedient, the boss 76 is rotated and consequently, the partition and cage 64. The reduced portion 73 of the said shaft 10 is rectangular in cross-section and extends through the aperture 68 in the partition 66. Therefore, the shaft 10 is rotated, the operation of the conventional internal combustion engine in the vehicle causing the starting-generating dynamo 12 to function as a generator.

If the turbine is started, by causing the starting-generating dynamo 12 to act as a motor as is detailed elsewhere in the specification, the shaft 10 will rotate. The reduced portion 73 of the shaft 10 extends through the aperture 68, whereby the partition 66 and cage 64 are rotated causing the boss 76 to also rotate. It may be seen that if rotation of the stub shaft 78 by the vehicle engine caused the boss 76 to remain screwed or fastened to the stub shaft 78, then rotation of the boss in the same direction by the turbine causes the shaft 76 to be threadedly removed from the stub shaft 78. This is the operation of this portion of the structure when the turbine is started, that is, as the boss 76 screws off the shaft 78, the cage 64 goes to the relative rear position and consequently the partition 66 slides to the rear on the rectangular reduced portion 73 of the shaft 10 and compresses the spring 74. As the turbine continues to operate, the stub shaft 76 merely spins against the rear end of the boss 78.

If the vehicle engine is started, the pulleys 80 rotate the shaft 78; the boss 76 is in contact with the rear end of the stub shaft 78 and the boss 76 is at rest. Therefore, the boss 76 becomes threadedly attached to the shaft 78. As soon as the boss 76 is fully screwed on the shaft, any further rotation of the shaft causes the boss 76 to rotate and the vehicle engine urges the shaft 10 to cause the starting-generating dynamo 12 to act as a generator as explained above.

Figure 6:
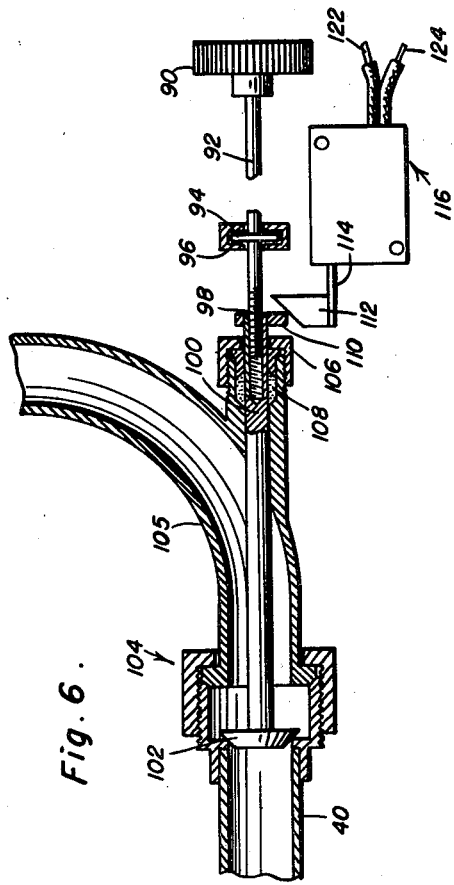
Figure 6 is a sectional view of a valve used in the present invention.

Referring now primarily to Figures 6 and 9, a valve mechanism is disclosed in the conduit 40 which is connected in association with the fuel pump 36 and the fuel distributor ring 28. This valve is manually operative through the medium of the knob 90 which projects through or adjacent a conventional dashboard in a vehicle. Associated with the knob 90 is a flexible cable or the like 92 which has a rotatable disk 94 attached thereto. The disk is seated in a suitable housing 96 which is fixed relative to the vehicle, whereby upon rotation of the knob 90, the threaded end portion 98 acting on the internal threads of a rod 100 will axially slide the rod.

A valve plate 102 is attached to the said rod 100 and engages the open end of the conduit 40. This of course, selectively regulates the opening and closing of the conduit 40 for admission of fuel to the fuel distributor ring 28.

The said conduit 40 may be supplied with a conventional fitting generally indicated at 104 for making the connection of its section or continuation 105 and for seating the valve plate 102 therein.

An apertured collar 106 may be supplied in association with the opposite end of the said rod 100 and suitable sealing or packing means 108 may be used in association with this connection, behind the said cap 106 for prevention of leakage. Further, an enlarged element 110 may be secured to the said rod 100 which engages a cam 112, secured to a reciprocating arm 114, forming a part of a switch generally indicated at 116.

The said switch contains a pair of contacts (see Figure 9) 118 and 120 respectively which have the wires 122 and 124 associated therewith. The said wires 122 and 124 form a portion of an electrical system utilized in association with the vehicle.

Referring now primarily to the wiring diagram of Figure 9 and that portion of the diagram shown in Figure 11, the operation of the invention will be completed more in detail. The battery 120 is conventional in vehicles and certain wires leading therefrom comprise only a small portion of a conventional wiring system in vehicles. At the point indicated at 130, the cut-out performs its usual function of preventing current from flowing from the battery 120 to starting-generating dynamo 12. The function of the conventional wiring system is no way affected in its intended and usual operation by the addition of the present invention thereto. As illustrated in Figure 9, the turbine is inoperative since the valve plate 102 in the fuel line 40 is closed and the switch 116 actuated thereby is open. A contact 132 and the contact 134 engage each other and the original vehicle circuit is unaffected. It is obvious then that the vehicle engine by means of the starting-generating dynamo 12 may be used to generate current through the conventional circuit, that portion thereof being illustrated in Figure 11.

The turbine may be caused to operate at any time during which the thermostat 142 is closed, by means of a knob 90. This knob opens the valve associated therewith and actuates the switch 116, described above. Of course, the thermostat is normally in the closed position when the temperature is low in the turbine housing. Fuel is permitted to flow to the distributor ring 28 of the turbine and the switch 116 allows current to flow through the primary side of the coil 140 through the conductor 122. The secondary of this coil supplies high tension voltage (and low current) to the ignition plugs 26 of the said turbine.

A thermostat 142 is supplied in the turbine casing for further control. This thermostat is so constructed that the contacts therein are normally engaged and current may flow through the thermostat when the turbine housing has a relatively low temperature. Therefore, at this time, current may flow through the electro-magnet 144 through the medium of the conductors 146 and 148 which are interconnected with the thermostat and the conductor 122. The electro-magnet attracts the metal bar 154 which is attached to a spring 150, which spring is seated in an insulated anchor 152. The spring 150 carries the contact 134. The attraction of the metal bar 154 by the electro-magnet breaks the circuit which was made by contacts 132 and 134 and making a new circuit. This new circuit allows current to flow from the battery 120 through the wire 156, by-passing the point 130. Of course, this causes the starting-generating dynamo 12 to act as a motor for the purpose of starting the turbine. As soon as the temperature in the turbine housing is sufficiently high, that is, when the turbine is in operation, the contacts of the thermostat 142 separate, thereby breaking the circuit through the electro-magnet 144, whereupon the spring bar 150 forces the contact 134 into engagement with the said contact 132. This restores the original generating circuit.

The turbine by means of the starting-generating dynamo 12 generates current through the same circuit as the starting-generating dynamo 12 generated current due to the action of the vehicle engine, before the turbine system was installed. From the foregoing and by utility of the described structure, it may be seen that a vehicle battery may be constantly charged by use of a small amount of fuel and by use of the versatility normally inherent in direct current generators.

It is apparent that various departures may be made without departing from the spirit of the invention. Accordingly, limitation is sought only in accordance with the scope of the following claims.

Having described the invention, what is claimed as new is:

1. An attachment for motor vehicle internal combustion engines comprising a starting-generating dynamo, resiliently biased drive means associated with said starting-generating dynamo, a shaft extending from said starting-generating dynamo, power means associated with said shaft, said power means selectively operable with said starting-generating dynamo relative to said resiliently biased drive means, a circuit connecting said drive means and said starting-generating dynamo, thermostatic means in said circuit for selectively controlling said starting-generating dynamo for use as a motor and a generator, said power means including a compressor and an ignition fired turbine.

2. An attachment for motor vehicle internal combustion engines comprising a starting-generating dynamo, resiliently biased drive means associated with said starting-generating dynamo, a shaft extending from said starting-generating dynamo, power means associated with said shaft, said power means selectively operable with said starting-generating dynamo relative to said resiliently biased drive means, a circuit connecting said drive means and said starting-generating dynamo, thermostatic means in said circuit for selectively controlling said starting-generating dynamo for use as a motor and a generator, said power means including a compressor and an ignition fired turbine, a housing around said power means, insulation space in said housing adapted to cooperate with the interior of a vehicle for heating.

3. An attachment for motor vehicle internal combustion engines comprising a starting-generating dynamo, resiliently biased drive means associated with said starting-generating dynamo, a shaft extending from said starting-generating dynamo, power means associated with said shaft, said power means selectively operable with said starting-generating dynamo relative to said resiliently biased drive means, a circuit connecting said drive means and said starting-generating dynamo, thermostatic means in said circuit for selectively controlling said starting-generating dynamo for use as a motor and a generator, said power means including a compressor and an ignition fired turbine, a housing around said power means, insulation space in said housing adapted to cooperate with the interior of a vehicle for heating, said shaft extending in said housing and secured to the rotor of said turbine.

4. An attachment for motor vehicle internal combustion engines comprising a starting-generating dynamo, resiliently biased drive means associated with said starting-generating dynamo, a shaft extending from said starting-generating dynamo, power means associated with said shaft, said power means selectively operable with said starting-generating dynamo relative to said resiliently biased drive means, a circuit connecting said drive means and said starting-generating dynamo, thermostatic means in said circuit for selectively controlling said starting-generating dynamo for use as a motor and a generator, said power means including a compressor and an ignition fired turbine, a housing around said power means, insulation space in said housing adapted to cooperate with the interior of a vehicle for heating, means on said shaft for pumping lubricant from an engine to the bearings associated with said shaft and said housing.

JOSEPH M. PARZINGER.

REFERENCES CITED

The following references are of record in the file of this patent:

UNITED STATES PATENTS

| Number | Country | Date |
| --- | --- | --- |
| 979,003 | Heany | Dec. 20, 1910 |
| 996,234 | Haskins | June 27, 1911 |
| 1,102,455 | Sundh | July 7, 1914 |
| 1,117,378 | Heany | Nov. 17, 1914 |
| 1,356,065 | Heinze | Oct. 19, 1920 |
| 1,372,864 | Cox | Mar. 29, 1921 |
| 1,409,736 | Lea | Mar. 14, 1922 |
| 1,475,485 | Gordon | Nov. 17, 1923 |
| 1,493,773 | Dorion | May 13, 1924 |
| 1,697,897 | Apple | Jan. 8, 1929 |
| 1,752,224 | Apple | Mar. 25, 1930 |
| 1,992,568 | Connor | Feb. 26, 1935 |
| 2,070,615 | Plante | Feb. 16, 1937 |